United States Patent [19]
Chiti

[11] 3,804,292
[45] Apr. 16, 1974

[54] FIRE-PREVENTING FUEL TANK FOR MOTOR VEHICLES AND/OR BOATS

[76] Inventor: Carlo Chiti, Via E. Fermi, 7, Settimo Milanese, Italy

[22] Filed: June 15, 1971

[21] Appl. No.: 153,287

[30] Foreign Application Priority Data
Aug. 6, 1970  Italy.................................. 28374/70
Feb. 17, 1971  Italy.................................. 20695/71

[52] U.S. Cl................. 220/88 B, 137/264, 220/20, 220/22
[51] Int. Cl....................... B01d 19/00, B65d 25/04
[58] Field of Search................... 137/262, 264, 255; 220/5 R, 5 A, 22, 20, 88 B

[56] References Cited
UNITED STATES PATENTS

| | | | |
|---|---|---|---|
| 1,347,057 | 7/1920 | Ross | 220/88 B |
| 1,020,567 | 3/1912 | Moeller | 229/DIG. 2 |
| 2,718,330 | 9/1955 | Adamson | 220/88 B |
| 2,850,083 | 9/1958 | Frost | 220/88 B |
| 2,912,054 | 11/1959 | Mathisen | 220/88 B |
| 3,489,310 | 1/1970 | Brumme | 220/5 R |

Primary Examiner—George E. Lowrance
Attorney, Agent, or Firm—Cushman, Darby & Cushman

[57] ABSTRACT

A fire-preventing fuel tank for motor vehicles and motor boats is disclosed, in which adjacent but separate volumes are provided in the tank, one kind of volumes holding the fuel, whereas the other holds a substance (e.g. a halogen), which, when admixed to the fuel, makes it non flammable. In the case of an accident, the shock ruptures the partition walls between the chambers holding the fuel and those holding the other fluid, so that fire is prevented. A number of different embodiments are described, but all of them realize the concept outlined above.

6 Claims, 13 Drawing Figures

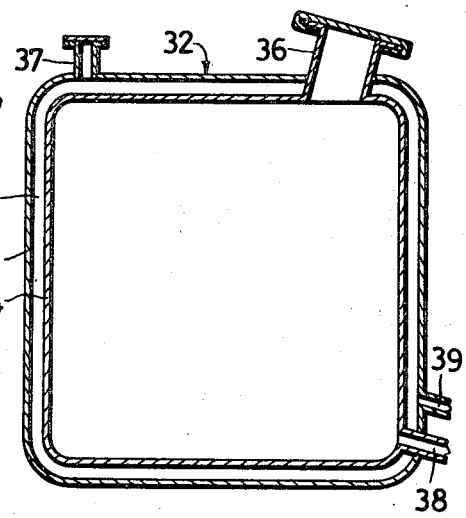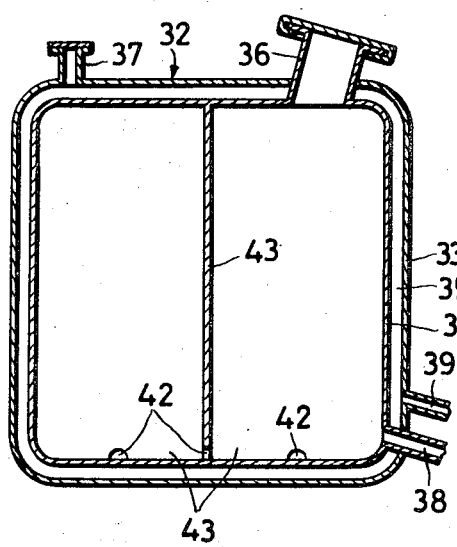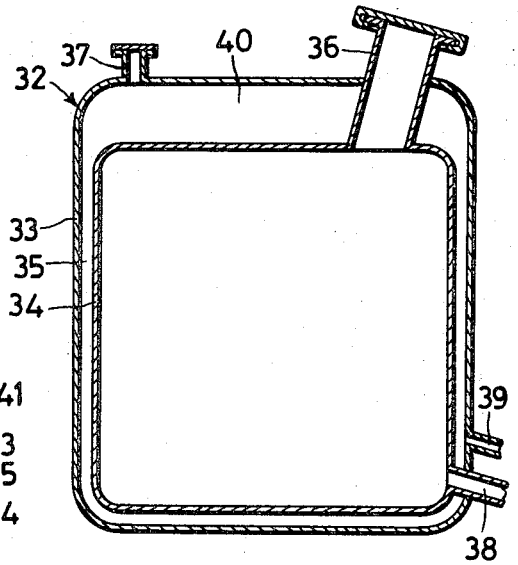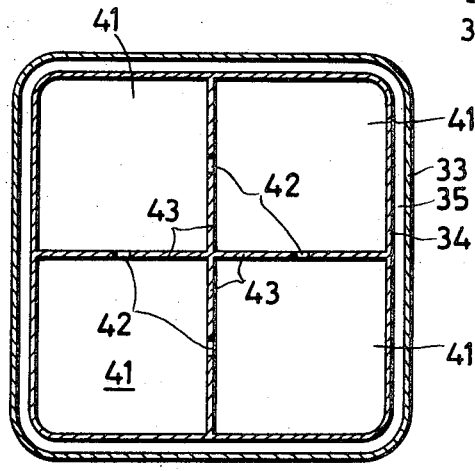

FIRE-PREVENTING FUEL TANK FOR MOTOR VEHICLES AND/OR BOATS

This invention relates to a fire-preventing fuel tank for motor vehicles and/or boats, more particularly for motor vehicles and motor boats as used in race contests.

As is known, the necessity of having a considerable volume of inflammable fuel aboard of motor vehicles and boats involves a remarkable fire hazard, especially in the case of collisions in which the fuel tank may be involved.

An object of the present invention is to provide a fuel tank for motor vehicles and motor boats which affords a high margin of safety especially in the case of an accident.

To this purpose, it has been envisaged to provide a tank which is partitioned into a plurality of adjacently located chambers which are fluid-tight with respect to each other, which store in their interior, according to a preselected ratio, a fluid fuel and at least another fluid which, when admixed with the fluid fuel, makes the latter non-flammable, means being provided for keeping said ratio unaltered as the fluid fuel is being burned.

Said other fluid can be, for example, a halogen.

In order that the features of the subject invention may be better understood, a description will now be given, by way of example only and without limitation, of a few possible embodiments thereof, reference being had to the accompanying drawings, wherein:

FIGS. 7 and 8 are two vertical cross-sectional views which illustrate two additional embodiments of the tank in question.

FIG. 9 is a vertical cross-sectional view which illustrates yet another embodiment of the tank.

FIG. 10 is a horizontal cross-sectional view of the tank shown in FIG. 9.

Figure 1:
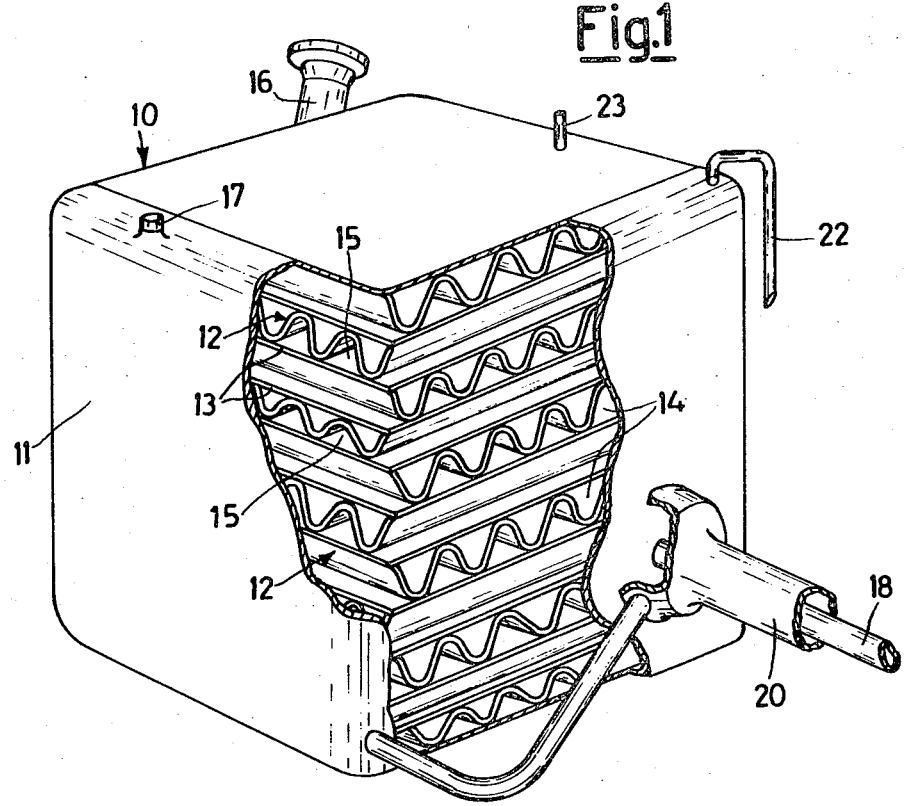
FIG. 1 is a perspective view of a tank made according to this invention.

With reference to FIG. 1 of the drawings, the numeral 10 generally indicates a fuel tank for a motor vehicle or motor boat constructed according to the invention and comprising a box-like casing 11 which houses a stack of elements 12, each of which has an undulated outline. Each of the undulated element 12 has its undulations perpendicularly arranged with respect to those of the adjoining element and is separated threrefrom by a partition board 13 which can also be integral with the element 12. By so doing, as clearly shown in the drawing, a plurality of alveoles 14, 15 are defined, which are perpendicular to one another and sealtight with respect to one another, the alveoles 14 for the fuel and the alveoles 15 for an appropriate fluid, which, when admixed to the fuel, lakes the latter non-flammable.

To the casing 11 are mounted two fluid inlets 16, 17, which communicate with the alveloes 14 and 15 respectively. The numeral 18 indicates a duct which communicates with the alveoles 14 for feeding the motor vehicle engine with fuel through a pump 19 (FIG. 2) and 20 indicates a duct there-for withdrawing there-from 15 through a pump 21, said fluid which, when admixed with the fuel, makes the latter non-flammable. 22 and 23 indicate two venting pipes, for the alveoles 14 and 15, respectively.

It will be understood that, in the case of an accident, if the tank is damaged, the fuel becomes spontaneously admixed with the other fluid aforementioned so as to form a non-flammable mixture therewith. Of course, the interior of the tank could be embodied in many other ways without changing anything, at least from an ideal point of view, for example as shown in FIGS. 3 to 6.

Figure 3:
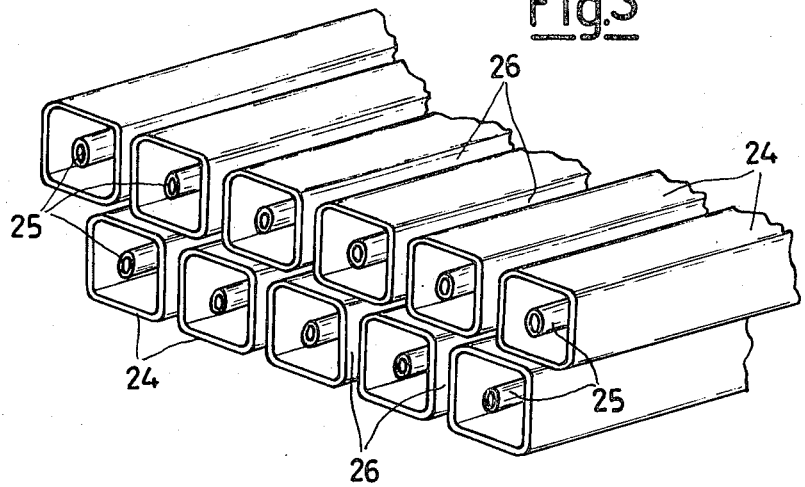
FIGS. 3 and 4 are detailed views showing two alternative embodiments of the interior of the tank.

As shown in FIG. 3, there could be tubes 24 and 25, concentrically inserted into one another, the tube 24 for the fuel and the annular space between the tubes 24 and 25 for the other fluid. A third fluid could possibly be stored in the interspace 26 between adjacent tube bundles.

Figure 4:
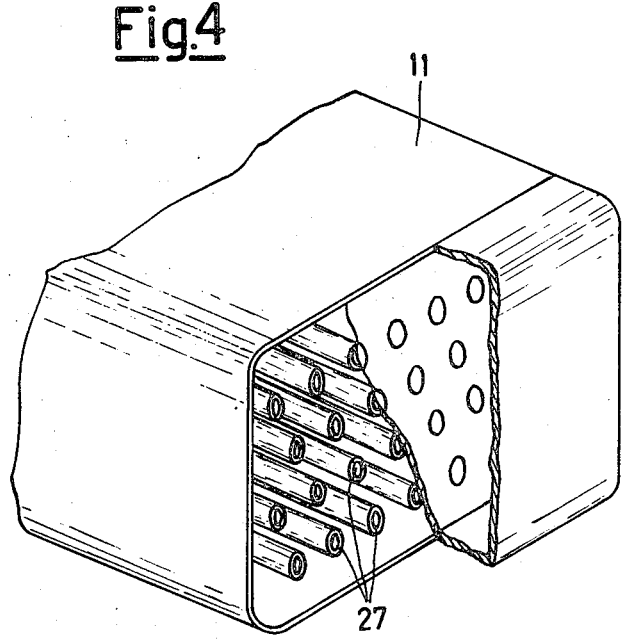

As an alternative, as shown in FIG. 4, the interior of the casing 11 could have a plurality of tubes 27 for the fuel running through said inner space, whereas the other fluid could be stored outside the tubes.

Figure 5:
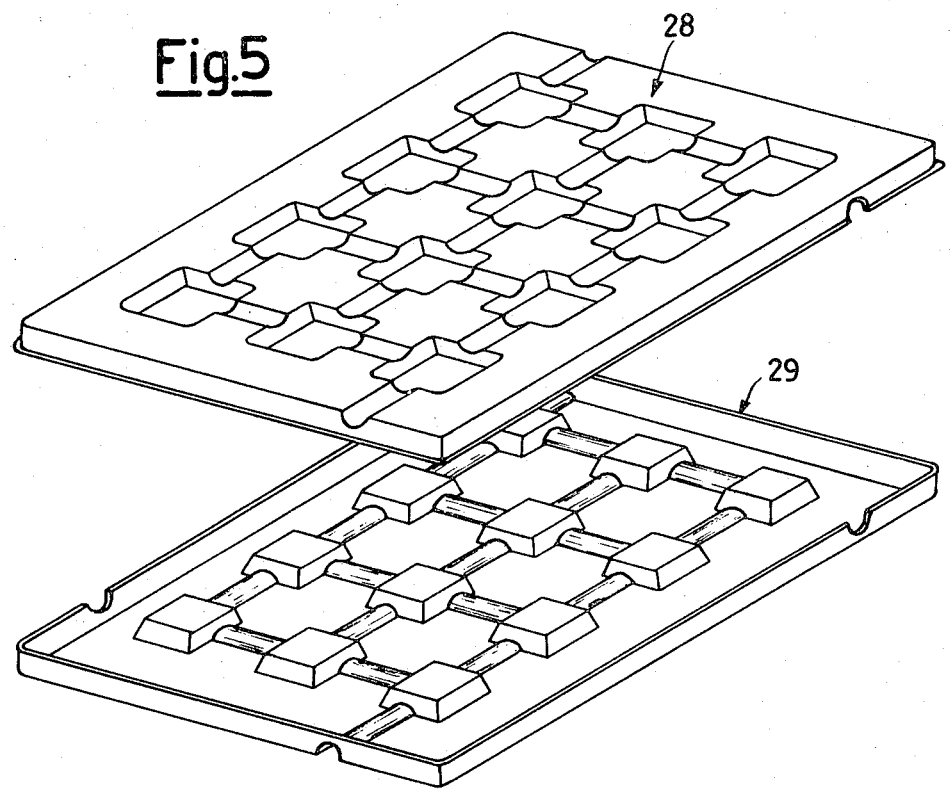
FIGS. 5 and 6 are exploded view and a cross-sectional view, respectively, of a further embodiment of the interior of the tank.
Figure 6:
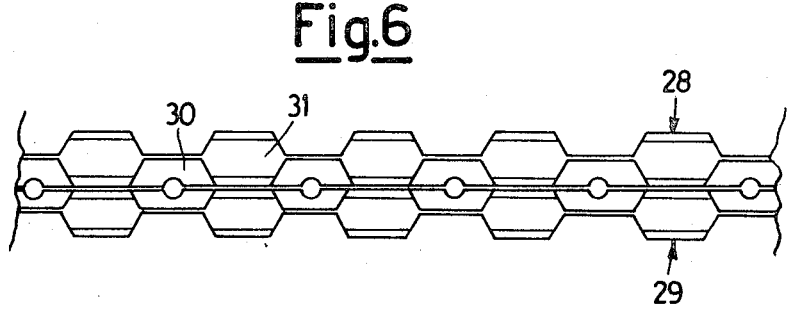

Another approach could be that shown in FIGS. 5 and 6, wherein, by virtue of the mating of two elements 28 and 29, which are appropriately shaped, a plurality of alveoles 30, 31 is defined, which communicate with each other, as shown. The alveoles 30 are for the fuel and the alveoles 31 for the other fluid.

Yet another approach could be the one shown in FIG. 7, which illustrates a tank, generally shown at 32 and consisting of a first outer container 33 and an inner second container 34, the latter being housed within said first container 33 so as to form therewith a peripheral jacket 35. The second container 34 is intended to hold a fluid fuel, whereas the jacket 35 is intended to contain an apporpriate substance, such as a halogen which, as admixed with the fluid, makes the latter non flammable. The numerals 36 and 37 are two inlets, for the fluid fuel contained in the container 34 and for the fire-preventing substance held in the jacket 35, respectively. The numerals 38 and 39 are, respectively, two ducts for feeding the engine with fuel, and for discharging the fire-preventing substance.

The jacket 35 could have a top volume 40 (FIG. 8) larger than the side and the bottom volumes, so as to have a larger amount of fire-preventing substance available. In addition, as shown in FIGS. 9 and 10, the inner container 34 could be partitioned into four compartments 41 by means of partition walls 43, said compartments communicate with each other through passageways 42 so as to diminish and slow down the fluid fuel spillage in the case of an accident.

Figure 11:
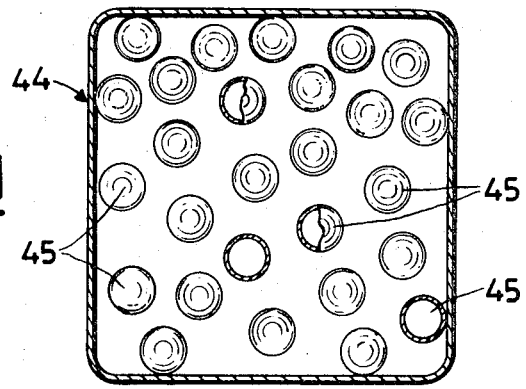
FIGS. 11 and 12 are two horizontal cross-sectional views of two still further embodiments on the tank.
Figure 12:
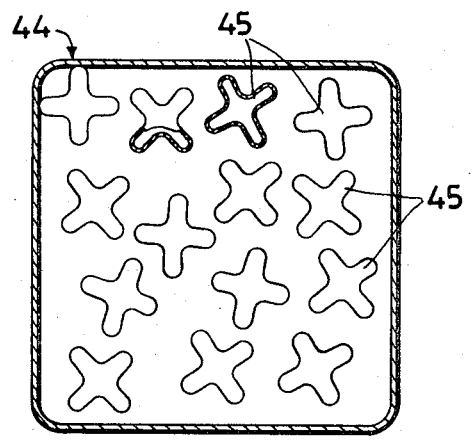

According to another embodiment, the subject tank could be a conventional reservoir vessel 44 (FIGS. 11—12) in whose interior a plurality of bodies 45 is immersed, preferably of glass, containing the fire-preventing substance, said bodies being possibly of different shapes, such as spherical or starlike, as shown in FIGS. 11, 12.

Figure 13:
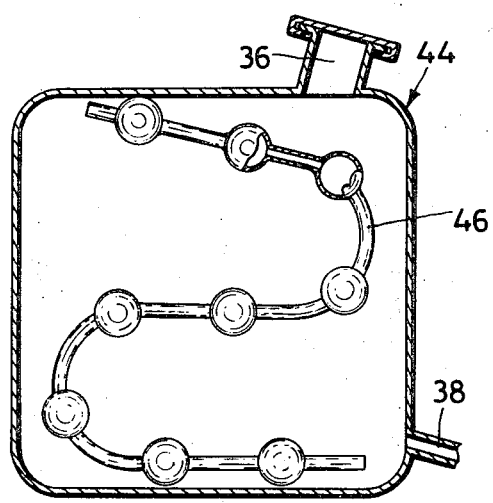
FIG. 13 is a vertical cross-sectional view showing still another embodiment of the tank.

Such bodies can be immersed in the reservoir in a random-like manner (FIGS. 11, 12) or can they be tied together by any flexible connection element 46 (FIG. 13).

A tank so constructed is filled with preselected amounts of either fluid so as to obtain, if and when an accident occurs, an admixture of the two fluids such as to ensure the best results.

Figure 2:
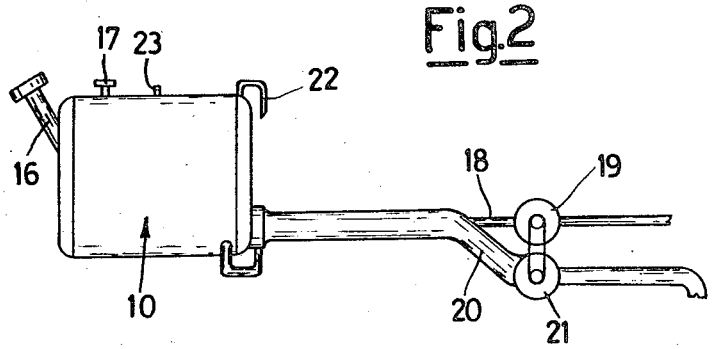
FIG. 2 is a diagrammatical showing of the hydraulic system of said tank.

In order that the original ratio of the two fluids may be kept constant, the pumps 19, 21 are suitably ganged as is diagrammatically shown in FIG. 2 so as to have a certain fuel consumption to correspond to an equal consumption of the other fluid.

It will be noted, in addition, that, especially in the embodiments shown in FIGS. 1 to 6, the alveoles for the two fluids are, individually, of a comparatively small size, so that a possible burning of the fluid fuel contained in one alveole and which did not become admixed with the other fluid is not a considerable hazard.

The embodiment of the invention in which an exclusive property or privilege is claimed are defined as follows :

1. A self-extinguishing fire preventing fuel tank for vehicles that holds a combustible fuel and fluid fire extinguishing agent in a pre-selected ratio with the fuel, whereupon the occurrence of a condition capable of causing the fuel to ignite the tnak will insure an immediate and intimate admixture of the fire extinguishing agent and fuel so that the fuel will become a non-flammable mixture:
   a. a plurality of undulating elements stacked at different levels and each element having an undulating surface, wherein at each level the surfaces are perpendicularly arranged relative to each other;
   b. partition means formed between each level of the elements and are effective to form with the elements a plurality of alveoles at each level that is in fluid-tight relationship with an adjacent level;
   c. means for providing the fuel to the alveoles at alternate levels; and
   d. means for providing the fire extinguishing agent to the remaining levels of the stacked elements.

2. The fuel tank of claim 1 further comprising: means cooperating with the fuel and the fire-extinguishing agent so as to maintain the pre-selected ratio during consumption of the fuel.

3. The fuel tank of claim 2 wherein the cooperation means comprises:
   a. a first pump connected with a duct communicating with the alveoles containing the fuel; and
   b. a second pump connected to a duct communicating with the alveoles containing the fire-extinguishing agent, wherein both pumps are operatively ganged to each other so as to ensure the pre-selected ratio being maintained.

4. The fuel tank of claim 3 wherein the first pump is a delivery pump and the second pump is a discharge pump.

5. The fuel tank of claim 1 wherein the fire-extinguishing agent is a halogen type.

6. A self-extinguishing fuel tank for a combustible fuel comprising: a casing, a fuel inlet and a fuel outlet associated with said casing; means within said casing defining a large number of distinct fuel passages which extend from said inlet to said outlet and which are in communication with each other only at their opposite ends; means within said casing defining a large number of distinct second passages which are sealed from said fuel passages and which are in communication with each other only at their ends, and each of which is immediately adjacent one of said fuel passages, the interior of said casing being entirely filled with said passages; and inlet and outlet means for fire-extinguishing fluid associated with said second passages.

* * * * *